United States Patent
Sato

(10) Patent No.: US 9,411,631 B2
(45) Date of Patent: Aug. 9, 2016

(54) APPARATUS, AND CONTROL METHOD FOR IMAGE PROCESSING DELETION OF A COMMON DEFINITION FILE USED FOR GENERATION OF A TEMPLATE FILE

(71) Applicant: CANON KABUSHIKI KAISHA, Tokyo (JP)

(72) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 13/715,146

(22) Filed: Dec. 14, 2012

(65) Prior Publication Data
US 2013/0179887 A1   Jul. 11, 2013

(30) Foreign Application Priority Data
Dec. 26, 2011 (JP) .................................. 2011-284123

(51) Int. Cl.
| | |
|---|---|
| G06F 17/00 | (2006.01) |
| G06F 15/00 | (2006.01) |
| G06F 9/46 | (2006.01) |
| G06F 17/21 | (2006.01) |
| H04N 1/00 | (2006.01) |
| G06F 3/12 | (2006.01) |

(52) U.S. Cl.
CPC ............ *G06F 9/46* (2013.01); *G06F 17/211* (2013.01); *H04N 1/0097* (2013.01); *H04N 1/00464* (2013.01); *H04N 1/00949* (2013.01); *G06F 3/1204* (2013.01); *G06F 3/1257* (2013.01); *G06F 3/1285* (2013.01)

(58) Field of Classification Search
CPC ........... G06F 15/16; G06F 3/12; G06F 15/00; G06F 17/211

USPC ............................ 715/235; 358/1.15; 709/203
See application file for complete search history.

(56) References Cited

U.S. PATENT DOCUMENTS

| | | | |
|---|---|---|---|
| 7,991,317 B2 | 8/2011 | Kato et al. | |
| 2007/0011226 A1* | 1/2007 | Hinni et al. | 709/203 |
| 2007/0250705 A1* | 10/2007 | Smith | G06Q 30/0266 713/157 |
| 2009/0174897 A1* | 7/2009 | Sato | 358/1.15 |
| 2010/0208295 A1* | 8/2010 | Sato | 358/1.15 |
| 2012/0036425 A1* | 2/2012 | Sato | 715/234 |

FOREIGN PATENT DOCUMENTS

| | | |
|---|---|---|
| JP | 2001-312490 A | 11/2001 |
| JP | 2008-210383 A | 9/2008 |

* cited by examiner

*Primary Examiner* — Cesar Paula
*Assistant Examiner* — Jian Huang
(74) *Attorney, Agent, or Firm* — Fitzpatrick, Cella, Harper & Scinto

(57) ABSTRACT

The present invention is intended for properly receiving set data in setting items of a series of processes. The present invention solves the problem by controlling to determine whether the setting item of the unique processing information and the setting item of the shared processing information are identical, to generate, when the setting items are determined to be identical and when a setting item for which set data is different in the unique and shared processing information is identified, template processing information including information indicating the identified setting item and the setting item of the shared processing information, and to store the template processing information, and by displaying a user interface receiving the set data of the identified setting item from among the setting items of the template processing information at the time of generating new unique processing information by using the template processing information.

6 Claims, 12 Drawing Sheets

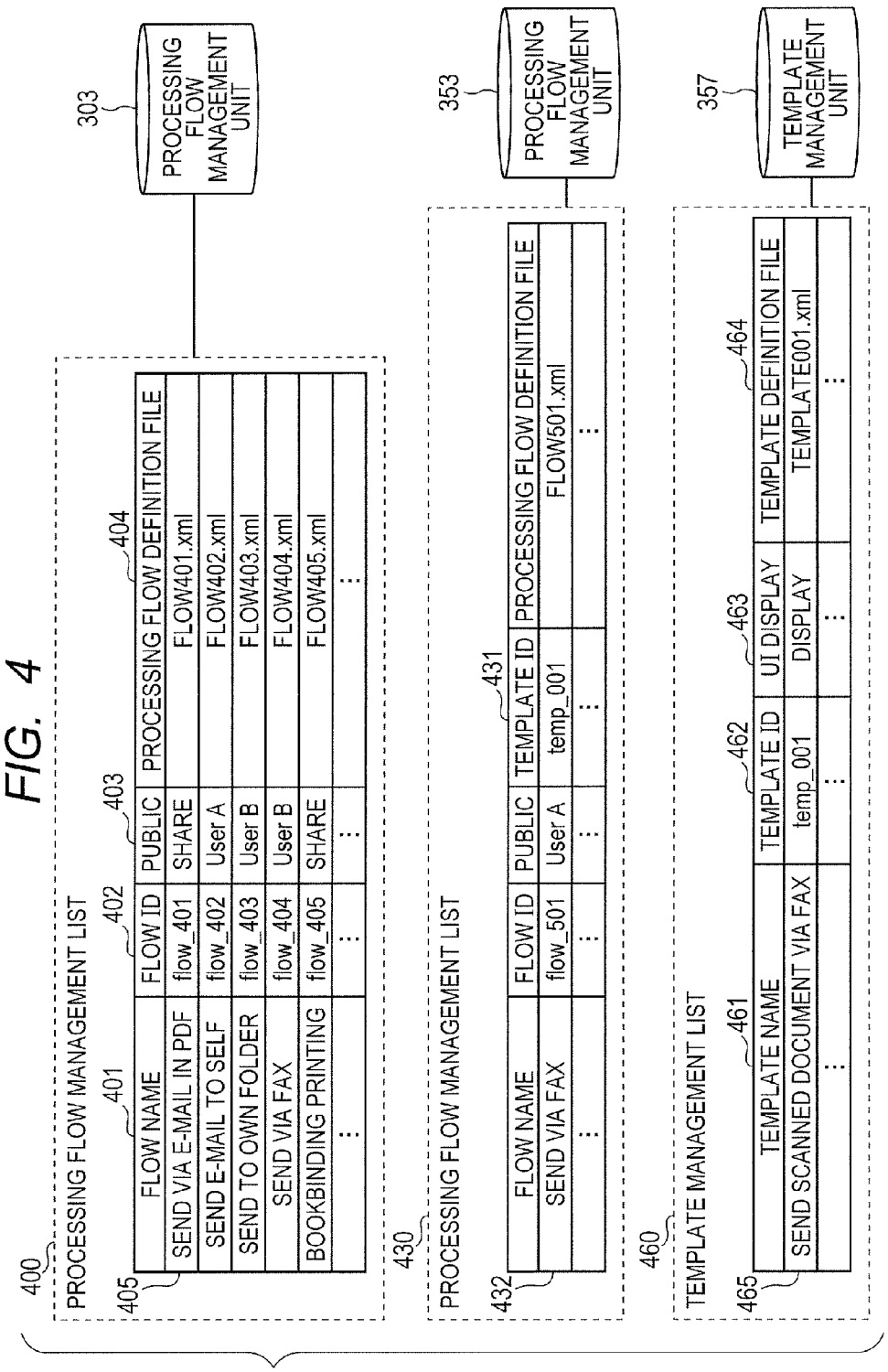

FIG. 5A

```xml
<?xml version="1.0" encoding="UTF-8"?>
<JobScript name="SEND IN PDF VIA E-MAIL" public="share" id="flow_401" ...>
  <Scan>
    <Settings>
      <DocumentSize>AUTO</DocumentSize>
      <ColorMode>FullColor</ColorMode>
      <Resolution>600x600</Resolution>
      <CopyRatio>100</CopyRatio>
    </Settings>
  </Scan>
  <Send>
    <Settings>
      <EmailAddress>aaa@co.jp</EmailAddress>
      <FileFormat>PDF</FileFormat>
      <FileName>test</FileName>
    </Settings>
  </Send>
</JobScript>
```

FIG. 5B

```xml
<?xml version="1.0" encoding="UTF-8"?>
<Template id="temp_001">
  <TemplateName>SEND SCANNED DOCUMENT VIA FAX </TemplateName>
  <UserSettingItem>FaxAddress, Pass</UserSettingItem>
  <JobScript>
    <Scan>
      <Settings>
        <DocumentSize>AUTO</DocumentSize>
        <ColorMode>FullColor</ColorMode>
        <Resolution>200x200</Resolution>
        <CopyRatio>100</CopyRatio>
      </Settings>
    </Scan>
    <Send>
      <Settings>
        <FaxAddress/>
        <Line>Auto</Line>
        <FCode>1234</FCode>
        <Pass/>
      </Settings>
    </Send>
  </JobScript>
</Template>
```

APPARATUS, AND CONTROL METHOD FOR IMAGE PROCESSING DELETION OF A COMMON DEFINITION FILE USED FOR GENERATION OF A TEMPLATE FILE

BACKGROUND OF THE INVENTION

1. Field of the Invention

The present invention relates to an apparatus, a system, a control method and a program for image processing.

2. Description of the Related Art

Multiple tasks relating to document data in an image processing apparatus such as an MFP (Multi-Function Peripheral) are combined to make a series of processes and the series of processes is registered in the image processing apparatus in advance. An application (processing flow application) that can execute the series of processes when a user calls the registered series of processes has been provided. According to this processing flow application, it is possible to execute a frequently-used combination of processes without troublesome operations. In the present description, a combination of multiple tasks to make a series of processes flow is referred to as a processing flow. In addition, a file in which definitions of the processing flow is described is referred to as a processing flow definition file.

A task refers to a process executable for various data such as document data, text data, and image data, and refers mainly to a process executable by an individual function of an image processing apparatus that has multiple functions. Tasks in an image processing apparatus refer to scanning documents, printing document data, transmitting document data (such as e-mails, faxes, files), and storing document data in a disk (saving in a hard disk inside/outside of the image processing apparatus). Note that tasks are not limited to the above-mentioned processes.

An image processing apparatus incorporating a processing flow application holds a processing flow definition file and displays a button for executing a processing flow as a UI (User Interface) based on the processing flow definition file. When this button is pressed by a user, the image processing device analyzes the processing flow definition file and starts execution of the processing flow defined by the processing flow definition file.

In the processing flow definition file, it is possible to designate (define) whether the processing flow is open to the public by indicating "shared" that is shared by users, or "exclusive to a user" that is unique to a user. The image processing apparatus analyzes this definition and controls so that when a user logs in, only a button to execute the processing flow "shared" by users and a button to execute the processing flow "exclusive to a user," which is unique to the logged-in user, are displayed in the UI.

In the present description, a processing flow "shared" by users is referred to as a shared processing flow. A processing flow "exclusive to a user" is a processing flow exclusively provided to the user and is therefore referred to as an exclusive processing flow. The following is one of the usages of the shared processing flow and the exclusive processing flow.

An administrator designates in advance setting items that a user would frequently use and registers the setting items as a shared processing flow. The user changes set data in a part of the setting items that need to be customized from among the setting items designated in the shared processing flow and registers the changed data as an exclusive processing flow. For example, the user changes the transmission destination of file transmission to the user's own e-mail address. As a result, the user can generate a desired exclusive processing flow by changing some of the set data.

However, there is a problem in operability such that even if a user only changes some of the set data in the above manner, operations are complicated. For example, operations that allow the user to change the transmission destination of the file transmission are as below.

The user opens a top screen of an edit screen of the shared processing flow. Next, the user selects the task to be changed. In this example, a "transmission" task is selected. Next, the setting item of the "transmission" task to be changed is selected. In this example, "e-mail address" is selected. The user then inputs the user's own e-mail address and registers the exclusive processing flow. As described above, the user has to perform many operations to change only a part of the set data.

Meanwhile, in the recent years, a new processing flow application, which handles template definition files of processing flows in addition to the existing processing flows, has been provided. A template definition file of a processing flow includes a definition of which setting items are to be changed in addition to the definition of a processing flow. The template definition file of the processing flow is, for example, preset in a new processing flow application for each use case by the administrator.

In an image processing apparatus incorporating the new processing flow application, a user can generate a processing flow definition file from a template definition file. Upon receiving an instruction to generate a processing flow definition file, the image processing apparatus incorporating the new processing flow application displays only a setting screen of setting items that are designated by the template definition file. As a result, the above-described operations such as selecting tasks to change set data becomes unnecessary, reducing the operation procedures, and therefore operability is improved.

In addition, it is possible to transmit a processing flow definition file from an image processing apparatus incorporating the conventional processing flow application to an image processing apparatus incorporating the new processing flow application.

However, although a processing flow definition file of a shared processing flow prepared by an administrator as it is described above as one of usages of the shared processing flow and the exclusive processing flow is used like a template definition file, the processing flow definition file is not a template definition file. Therefore, even though a new processing flow application is used, a user has to perform the complicated operations as in the past when the user wishes to use an exclusive processing flow by changing the set data of some of setting items in the shared processing flow.

Here, a method for automatically generating a template has been disclosed (see Japanese Patent Application Laid-Open No. 2001-312490). In Japanese Patent Application Laid-Open No. 2001-312490, location information of constitution elements are compared for multiple pages, and if it is determined that location information of constitution elements is similar, the layout is made into a template.

A method for generating job template definition information from a user's operation history has been disclosed (see Japanese Patent Application Laid-Open No. 2008-210383). In Japanese Patent Application Laid-Open No. 2008-210383, operation history of a user is stored, and job template definition information is generated from the frequency of the operations at certain timing.

The system in Japanese Patent Application Laid-Open No. 2001-312490 makes a layout into a template by comparing location information of constitution elements for multiple pages. However, this cannot be applied to generation of a template definition file of a processing flow. The apparatus in Japanese Patent Application Laid-Open No. 2008-210383 generates job template definition information from the frequency of operations. However, the job template definition information does not include a definition of which setting items are to be changed as it is defined in the template definition file of the processing flow.

SUMMARY OF THE INVENTION

The present invention was made in view of this problem, and it is an objective of the present invention to more properly receive set data of setting items in a series of processes.

According to the present invention, it is possible to more properly receive set data of setting items in a series of processes.

Further features of the present invention will become apparent from the following description of exemplary embodiments with reference to the attached drawings.

BRIEF DESCRIPTION OF THE DRAWINGS

FIG. 4 is a diagram illustrating an example of information of a definition file.

FIGS. 5A and 5B are diagrams illustrating an example of a definition file.

DESCRIPTION OF THE EMBODIMENTS

Preferred embodiments of the present invention will now be described in detail in accordance with the accompanying drawings.

Hereinafter, an embodiment of the present invention will be described based on the accompanying drawings. It should be noted that the following embodiment is not intended to limit the present invention and not all of the configurations described in the embodiment are necessarily essential to the solving means of the problem of the present invention.

Embodiment 1

Figure 1:
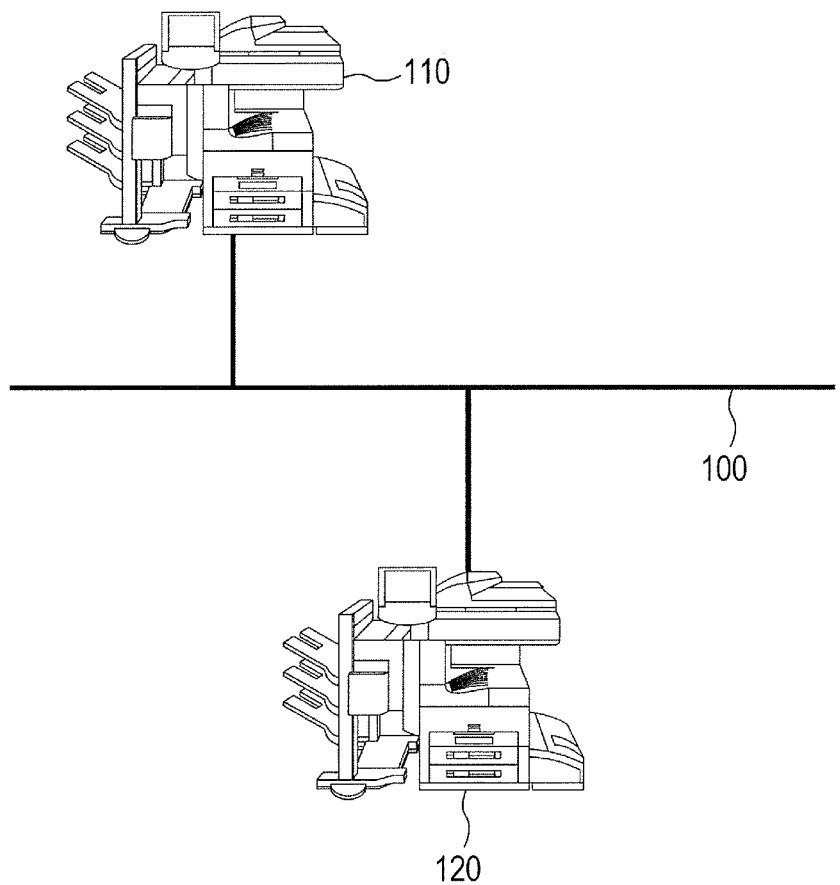
FIG. 1 is a diagram illustrating an example of a system configuration.

Firstly, Embodiment 1 is explained.
(System Configuration)
FIG. 1 is a diagram illustrating an example (an image processing system) of a configuration of a system according to the present embodiment. As illustrated in FIG. 1, an MFP 110 and an MFP 120, which are examples of image processing devices, are each connected to a LAN 100 such as Ethernet (registered trademark). It should be noted that in the present embodiment, the MFP 110 and the MFP 120 are simply referred to as an MFP when the MFP 110 and the MFP 120 do not have to be specifically distinguished.

The MFP has a copy function. The MFP also has a data transmission function to read images on documents and to transmit the read image data (can be text data) to a designated apparatus on the LAN 100 by using an FTP protocol, an SMB protocol or the like. In addition, the MFP can crate an e-mail that has various data (such as image data, text data, document data) attached as an attachment file and transmit the e-mail by using an e-mail server (not illustrated).

In the present embodiment, however, the number of the apparatuses is not limited to the above-described number. In addition, although the present embodiment adopts the LAN 100 as a connection method, it is not limited to the LAN 100. For example, any networks such as a WAN (public network), serial transmission systems such as USB, and parallel transmission systems such as Centronics and SCSI can be used.

(Hardware Configuration of MFP)

Figure 2:
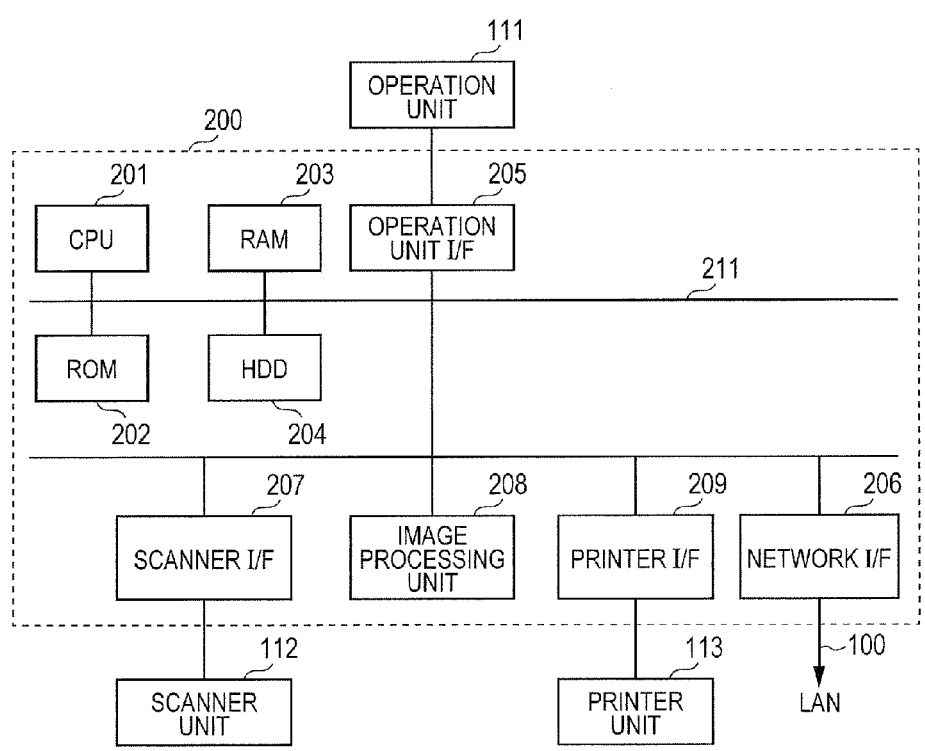
FIG. 2 is a diagram illustrating an example of an MFP hardware configuration.

FIG. 2 is a diagram illustrating an example of a hardware configuration of the MFP 110 and the MFP 120. As components, the MFP is configured to include a scanner unit 112 serving an image input device, a printer unit 113 serving an image output device, a controller 200 that provides overall control for the MFP, and an operation unit 111.

The scanner unit 112 is a device that reads an image on a document and generates image data. Documents are set to a document feeder and a document read instruction is given from the controller 200 to the scanner unit 112. When receiving this instruction, the scanner unit 112 feeds the documents one by one from the document feeder to perform document read operation. A method of reading the documents is not limited to automatic feeding using a document feeder but can be a method of scanning documents by placing the documents on a glass surface and moving an exposure unit (not illustrated).

The printer unit 113 is an image formation device that forms an image corresponding to the image data received from the controller 200 on a recording medium such as a sheet of paper. Note that the image formation method is not limited to an electrophotographic method using a photosensitive drum and a photosensitive belt in the present embodiment, but can be an inkjet method or the like.

The controller 200 is electrically connected to the operation unit 111, the scanner unit 112 and the printer unit 113. The controller 200 is also connected to the LAN 100 via a network I/F 206. That is, the controller 200 is connected to other devices via the LAN 100. That is, the controller 200 is connected to other apparatuses (external devices) via the LAN 100. This enables the MFP to communicate by using the HTTP protocol.

A CPU 201 centrally controls access to the currently-connected various devices and access from the devices based on a program stored in a ROM 202. In addition, the CPU 201 centrally controls various processes executed within the controller 200. The ROM 202 stores various types of information. The ROM 202 stores programs to implement MFP functions and processes shown in a flowchart described later. Furthermore, the ROM 202 stores a boot program for apparatuses.

A RAM 203 serves as a system work memory for the CPU 201 to operate and also as a memory for temporarily storing image data. The RAM 203 includes an area that holds the stored content, for example, by backup power after the power-off of the apparatus and an area in which the stored content is erased after the power-off. An HDD 204 is a hard disk drive and is able to store various types of data (e.g., definition files described later or management list described later) used in various types of processes. It should be noted that the ROM 202, the RAM 203, and the HDD 204 are examples of a storage unit that stores various types of information.

An operation unit I/F 205 is an interface for connecting a system bus 211 and the operation unit 111. The operation unit I/F 205 receives image data for being displayed in the operation unit 111, which is an example of a display unit, from the system bus 211, outputs the image data to the operation unit 111, and outputs the information input from the operation unit 111 to the system bus 211. A network I/F 206 is connected to the LAN 100 and the system bus 211 to input/output information.

A scanner I/F 207 corrects, processes, and edits the image data received from the scanner unit 112. Note that the scanner I/F 207 has a function of determining that the received image data is, for example, a color document, a black and white document, a text document, or a photographic document.

An image processing unit 208 executes processes such as changing orientation of image data and an image compression/decompression. The image processing unit 208 can also combine plural pieces of image data saved in the HDD 204 to generate image data of a single image.

A printer I/F 209 receives image data sent from the image processing unit 208, and performs image formation of the image data with reference to attribute data added to the image data. The printer I/F 209 outputs the image data that has undergone the image processing to the printer unit 113.

Note that in the present embodiment, the MFP is described as an MFP that displays a UI (User Interface) and is connected to a network, but the configuration is not limited to this configuration. The MFP in the present embodiment may be an image processing apparatus (computer), which has a configuration different from the above-described configuration, such as a general-purpose computer appropriately connected with a general-purpose scanner, a general-purpose printer, a general-purpose display and the like.

(Software Configuration of MFP)

Figure 3:
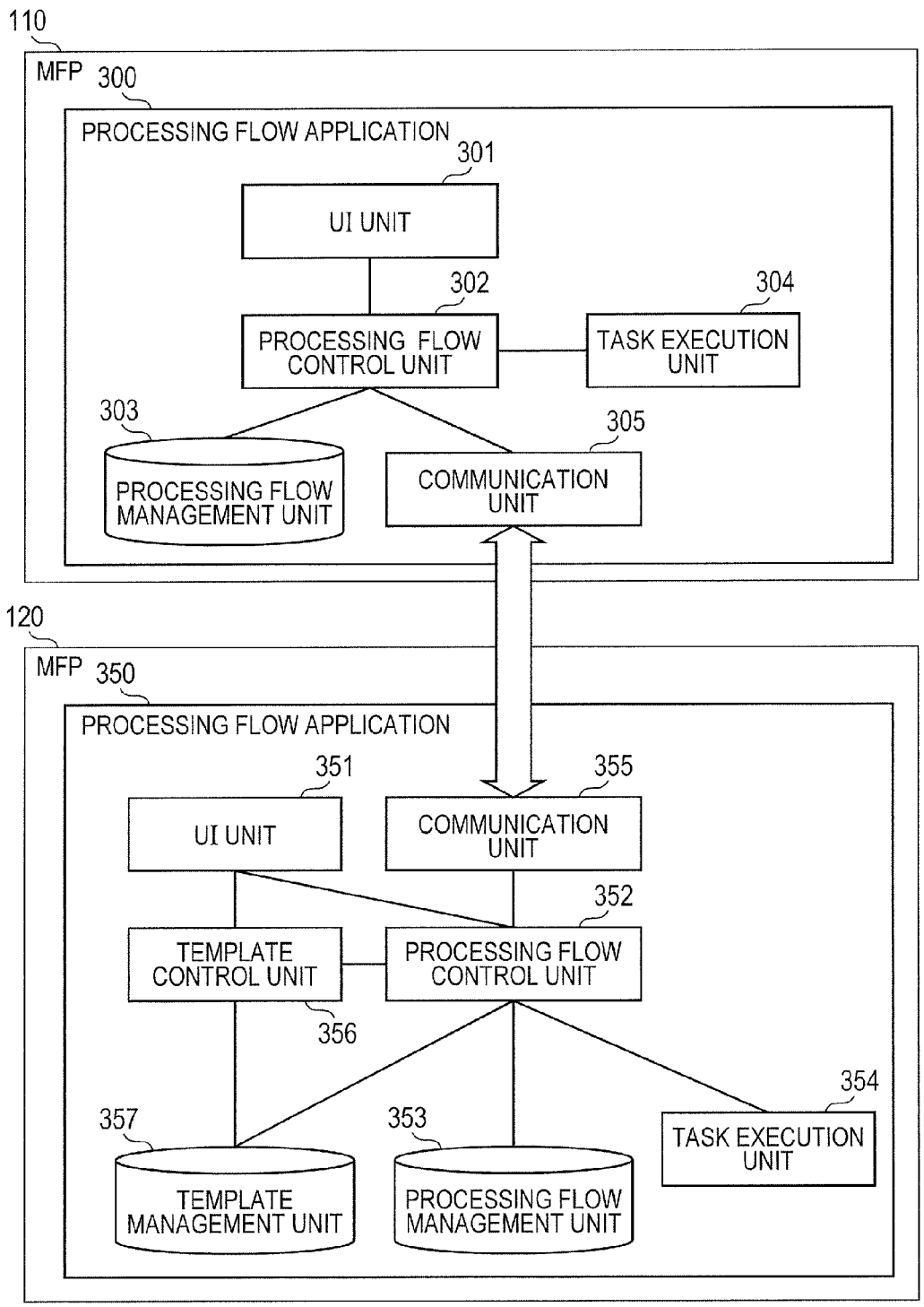
FIG. 3 is a diagram illustrating an example of an MFP software configuration.

FIG. 3 is a diagram illustrating an example of a software (processing unit) configuration of the MFP 110 and the MFP 120. As a result of an event that the CPU 201 reads out programs stored in the HDD 204 in the MFP 110 to the RAM 203 and executes the programs, the processing unit of the MFP 110 and the processes in a flowchart described later can be realized (becomes functional). As a result of an event that the CPU 201 reads out programs stored in the HDD 204 in the MFP 120 to the RAM 203 and executes the programs, the processing unit of the MFP 120 and the processes in a flowchart described later can be realized (becomes functional).

It should be noted that a portion of or all of processes relating to the processing unit in the MFP and the flowchart described later can be configured by using specialized hardware.

The MFP 110 has a processing flow application 300. The processing flow application 300 includes a UI unit 301, a processing flow control unit 302, a processing flow management unit 303, a task execution unit 304, and a communication unit 305.

The UI unit 301 displays the UI on the operation unit 111 through the operation unit I/F 205, and processes the input by a user from the operation unit 111. For example, the UI unit 301 displays a button for executing a processing flow (a flow of a series of processes) on the operation unit 111 based on processing flow information managed in the processing flow management unit 303. When the button is pressed by a user operating the operation unit 111 (user operation), the UI unit 301 senses the button being pressed and instruct the processing flow control unit 302 to execute a processing flow corresponding to the button.

The processing flow control unit 302 analyzes a processing flow definition file. More specifically, when execution of the processing flow is instructed from the UI unit 301, the processing flow control unit 302 acquires a processing flow definition file of the processing flow through the processing flow management unit 303. The processing flow control unit 302 then analyzes the acquired processing flow definition file and divides the processing flow into tasks. Moreover, the processing flow control unit 302 notifies the task execution unit 304 of each of the tasks so that the tasks are executed in an order designated in the processing flow definition file. Furthermore, the processing flow control unit 302 receives a processing flow definition file from the communication unit 305 and instructs the processing flow management unit 303 to register the processing flow definition file.

The processing flow management unit 303 stores processing flow definition files in the HDD 204 and manages the processing flow definition files. More specifically, the processing flow management unit 303 reads out or writes in the processing flow definition files stored in the HDD 204 in response to the instruction from the processing flow control unit 302.

The task execution unit 304 executes a task transferred from the processing flow control unit 302. The tasks executed in the task execution unit 304 include, for example, scanning documents, printing document data, transmitting document data (such as e-mails, facsimiles, files), and saving document data in disks (saving in hard disks inside/outside the MFP 110).

The communication unit 305 communicates with a communication unit 355 in the MFP 120 through the network I/F 206. The communication unit 305 transmits a processing flow definition file to the communication unit 355 in the MFP 120. In addition, the communication unit 305 receives a processing flow definition file from the communication unit 355 in the MFP 120 and transfers the file to the processing flow control unit 302.

The MFP 120 has a processing flow application 350. The processing flow application 350 can handle a template definition file of a processing flow, in addition to the processing flow definition file handled by the processing flow application 300. The template definition file of a processing flow is described later. In the following description, a template definition file of a processing flow is simply referred to as a template. Note that a template is an example of routine processing information used for generation of processing flow definition files or the like.

The processing flow application 350 includes a UI unit 351, a processing flow control unit 352, the processing flow management unit 353, a task execution unit 354, a communication unit 355, a template control unit 356, and a template management unit 357.

The UI unit 351 displays the UI on the operation unit 111 through the operation unit I/F 205, and processes the input by a user from the operation unit 111. For example, the UI unit 351 displays a button for executing a processing flow on the operation unit 111 based on information of processing flow definition file managed in the processing flow management unit 353. When the button is pressed by a user operation, the UI unit 351 senses the button being pressed and instruct the processing flow control unit 352 to execute a processing flow corresponding to the button.

Moreover, the UI unit 351 displays, for example, a button for allowing a user to generate a processing flow definition file from a template on the operation unit 111 based on template information managed in the template management unit 357. When the button is pressed by a user operation, the UI unit 351 senses the button being pressed and instruct the template control unit 356 to generate a processing flow definition file based on a template corresponding to the button.

The processing flow control unit 352 analyzes a processing flow definition file. More specifically, when execution of the processing flow is instructed from the UI unit 351, the processing flow control unit 352 acquires a processing flow definition file of the processing flow through the processing flow management unit 353. The processing flow control unit 352 then analyzes the acquired processing flow definition file and divides the processing flow into tasks. Moreover, the processing flow control unit 352 notifies the task execution unit 354 of each of the tasks so that the tasks are executed in an order designated in the processing flow definition file. Furthermore, the processing flow control unit 352 receives a processing flow definition file from the communication unit 355 and instructs the processing flow management unit 353 to register the processing flow definition file.

The processing flow management unit 353 stores processing flow definition files in the HDD 204 and manages the processing flow definition files. More specifically, the processing flow management unit 353 reads out or writes in the processing flow definition files stored in the HDD 204 in response to the instruction form the processing flow control unit 352.

The task execution unit 354 executes a task transferred from the processing flow control unit 352. The tasks executed in the task execution unit 354 include, for example, scanning documents, printing document data, transmitting document data (such as e-mails, facsimiles, files), and saving document data in disks (saving in hard disks inside/outside the MFP 120).

The communication unit 355 communicates with a communication unit 305 in the MFP 110 through the network I/F 206. The communication unit 355 transmits a processing flow definition file to the communication unit 305 in the MFP 110. In addition, the communication unit 355 receives a processing flow definition file from the communication unit 305 in the MFP 110 and transfers the file to the processing flow control unit 352.

The template control unit 356 analyzes a template. More specifically, when generation of a processing flow definition file by using a template is instructed from the UI unit 351, the template control unit 356 acquires the template through the template management unit 357. The template control unit 356 analyzes the acquired template and determines setting screens to be displayed and the display sequence.

The template control unit 356 requests that the UI unit 351 display the setting screens to be displayed. When a set data input by the user from the UI unit 351 is notified, the template control unit 356 temporarily holds the set data and requests that the UI unit 351 display the next setting screen. When display of all setting screens to be displayed is completed, the template control unit 356 generates a processing flow definition file from the template and the temporarily-held set data of the user and instructs the processing flow control unit 352 to register the processing flow definition file.

The template management unit 357 stores the template in the HDD 204 and manages the template. More specifically, the template management unit 357 reads out or writes in the templates stored in the HDD 204 in response to the instruction from the template control unit 356.

FIG. 4 is a diagram illustrating an example (a management list) of information on definition files managed by each of the management units in FIG. 3. Although a table form data structure is used as a management list in the present embodiment, the data structure is not limited, but can be text files such as CSV format or XML format.

A processing flow management list 400 is a list used for management of processing flow definition files in the processing flow management unit 303. The processing flow management list 400 is made of four columns from a column 401 to a column 404. In the processing flow management list 400, one record is used for management for one processing flow definition file.

The column 401 indicates the name of processing flow definition files (processing flow name). The processing flow name of a record 405 is "send via e-mail in PDF." The column 402 indicates the processing flow ID. The processing flow ID is an identifier to identify a unique processing flow definition file. The processing flow ID of the record 405 is "flow_401."

The column 403 indicates whether or not the processing flow definition file is open to the public. Because the record 405 is "shared," the processing flow of the processing flow definition file managed as the record 405 is a shared processing flow. The column 404 indicates the file name (or can be the address) of the processing flow definition file. The processing flow definition files are described later by referring to FIG. 5A.

A processing flow management list 430 is a list used for management of processing flow definition files in the processing flow management unit 353. In the processing flow management list 430, one record is used for management of one processing flow definition file. The processing flow management list 430 has a column 431 in addition to the column structure of the processing flow management list 400.

The column 431 indicates the template from which a processing flow definition file is generated. The column 431 indicates "temp_001" for a record 432, and this indicates that the processing flow definition file of the record 432 is generated from a template having a template ID of "temp_001."

When the column 431 contains a template ID corresponding to a processing flow definition file, this processing flow definition file and the template are in a linked state (associated with each other). This linked state allows a processing flow application 350 to display only a UI for changing set data in a setting item designated by the linked template at the time of editing the processing flow definition file. Note that when a processing flow definition file is not linked to a template, the column 431 is left blank.

A template management list 460 is a list used for management of templates in the template management unit 357. The template management list 460 is made of four columns from a column 461 to a column 464.

The column 461 indicates the name of templates (template name). The template name of a record 465 is "send scanned document via FAX." The column 462 indicates the template ID. The template ID is an identifier to identify a unique template. The template ID of the record 465 is "temp_001."

The column 463 indicates whether or not a UI that allows a user to generate a processing flow definition file from a template is displayed (UI display or hide). Because the UI display for the record 465 is "display," a UI that allows a user to generate a processing flow definition file from the template of the record 465 is displayed in the operation unit 111 of the MFP 120 as a button. Note that when the column 463 indicates "hide," the button is not displayed in the operation unit 111, and therefore the user cannot perform an operation to generate a processing flow definition file from the template of the button.

FIG. 5A is a diagram illustrating an example of a processing flow definition file (a processing flow definition file 500). The processing flow definition file 500 is a processing definition file with the file name "flow401.xlm" of the record 405. In this example, processing flow definition files are described in xml format. However, for the processing flow definition files, any format that can be processed by processing flow applications can be used appropriately.

A tag 501 is a "JobScript" tag, which indicates one processing flow definition file. A definition relating to the processing flow is provided in this tag. An attribute 502 is a "name" attribute, which indicates the name of the processing flow definition file (processing flow name). In this example, the processing flow name is "send via e-mail in PDF."

An attribute 503 is a "public" attribute, which indicates whether or not the processing flow definition file is open to the public. In this example, the attribute is "share (shared)," which indicates the processing flow of the processing flow definition file is a shared processing flow. An attribute 504 is an "id" attribute, which indicates the ID of the processing flow definition file (flow ID). In this example, the flow ID is "flow_401."

A tag 505 is a "Scan" tag, which indicates a task relating to scanning. A definition of a task relating to scanning is provided in this tag.

A tag 506 is a "DocumentSize" tag, which indicates a setting item to designate the document size to be scanned. Set data of the document size to be scanned is provided in this tag. In the processing flow definition file 500, "AUTO" indicating that the document size is automatically scanned without being designated is provided as set data.

A tag 507 is a "ColorMode" tag, which indicates a setting item to designate the color at the time of scanning the document. Set data of the color at the time of scanning the document is provided in this tag. In the processing flow definition file 500, "FullColor" indicating full color scanning is provided as set data.

A tag 508 is a "Resolution" tag, which indicates a setting item to designate the resolution at the time of scanning the document. Set data of the resolution at the time of scanning the document is provided in this tag. In the processing flow definition file 500, "600×600" indicating scanning at 600×600 resolution is provided as set data.

A tag 509 is a "CopyRatio" tag, which indicates a setting item to designate magnification ratio at the time of scanning the document. Set data of the magnification ratio at the time of scanning the document is provided in this tag. In the processing flow definition file 500, "100" indicating the magnification ratio is 100% is provided as set data.

A tag 510 is a "Send" tag, which indicates a task relating to transmission. A definition of a task relating to transmission is provided in this tag.

A tag 511 is an "EmailAddress" tag, which indicates a setting item to designate an e-mail address as a transmission destination. Set data of an e-mail address is provided in this tag. In the processing flow definition file 500, "aaa@co.jp" indicating that the document data is transmitted to an e-mail address of aaa@co.jp is provided as set data.

A tag 512 is a "FileFormat" tag, which indicate a setting item to designate the file format of the transmitted document data. Set data of the file format of the document data is provided in this tag. In the processing flow definition file 500, "PDF" indicating that the file format of the transmitted document data is PDF format is provided as set data.

A tag 513 is a "FileName" tag, which indicates a setting item to designate the name of the transmitted document data (document name). Set data of the document name of the document data is provided in this tag. In the processing flow definition file 500, "test" indicating that the document name of the transmitted document data is test is provided as set data.

FIG. 5B is a diagram illustrating an example of templates (template 550). The template 550 is a template of the file name "template001.xml" of the record 465. In this example, the template is described in XML format, but for the template, any format that can be processed by the processing flow applications can be used appropriately.

A tag 551 is a "Template" tag, which indicates one template. A definition relating to the template is provided in this tag. An attribute 552 is an "id" attribute, which indicates template ID. In this example, the template ID is "temp_001."

A tag 553 is a "TemplateName" tag, which indicates a template name. In this example, the template name is "send scanned document via FAX."

A tag 554 is a "UserSettingItem" tag, which indicates a setting item to display a setting screen at the time of generating a processing flow definition file from a template. In the case of the template 550, "FaxAddress, Pass" indicating that a setting screen for inputting setting items such as fax address and password is displayed is provided as set data. The processing flow application 350 determines the setting items to be displayed (setting screen) by analyzing the tag (tag 554).

A tag 555 is a "JobScript" tag. A definition relating to the processing flow is provided in this tag. Note that the MFP 120, when generating a processing flow definition file from a template, generates the processing flow definition file from the set data in this tag and set data input from the setting screen.

A tag 556 is a "FaxAddress" tag, which indicates a setting item to designate the fax address as a transmission destination of the document data. In the template 550, the set data is empty, which indicates that the fax address is not designated. In this manner, a template may be in a state in which set data is missing. This is because input of the set data in the setting item of the fax address is indicated by the tag 554, and a user can designate data after selecting a template.

A tag 557 is a "Pass" tag, which indicates a setting item to designate a password at the time of fax transmission. In the template 550, the set data is empty, which indicates that the password at the time of fax transmission is not designated.

Although the set data in the setting item designated by the tag 554 is empty, in the present embodiment, the set data (set data of setting items in a processing definition file of a shared processing flow, which is a basis of the template) may be entered.

(Transmission Processing of Processing Flow Definition File)

Firstly, the MFP 110 displays a login authentication screen on the operation unit 111 (not illustrated). When the MFP 110 accepts login processing via a user operation on the login authentication screen, the UI unit 301 of the processing flow application 300 displays UI of the processing flow application 300 (e.g., a operation screen 600 in FIG. 6).

At that time, the UI unit 301 acquires information of a processing flow definition file of a shared processing flow and information of a processing flow definition file of an exclusive processing flow of the logged-in user via the processing flow control unit 302 and the processing flow management unit 303. The processing flow definition file of the shared processing flow is an example of shared processing information common to users, and the processing flow definition file of the exclusive processing flow is an example of unique processing information unique to each user. The UI unit 301 generates a button to designate execution of the shared processing flow (shared processing flow button), a button to designate execution of the exclusive processing flow (exclusive processing flow button) and other buttons from the acquired information, and displays the generated buttons on the operation unit 111.

Figure 6:
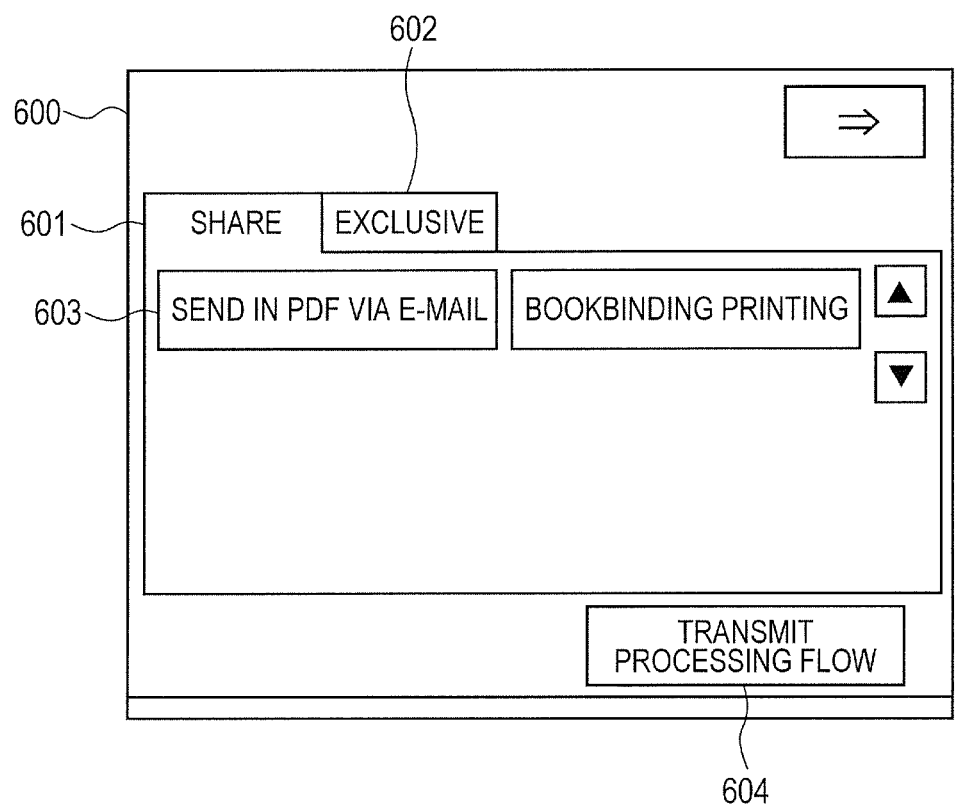
FIG. 6 is a diagram illustrating an example of a UI.

FIG. 6 is a diagram illustrating an example of a UI (operation screen 600) of the processing flow application 300. A tab page 601 is a tab page for displaying the shared processing flow button. FIG. 6 illustrates a state in which the shared processing flow button is displayed. A tab page 602 is a tab page for displaying the exclusive processing flow button.

A button 603 is a button to execute the shared processing flow. When the button 603 being pressed as a result of a user operation is detected, the UI unit 301 instructs execution of the processing flow of the button 603 (in this example, the processing flow of the record 405 in the processing flow management list 400) to the processing flow control unit 302. The button 604 is a button to transmit a processing flow definition file held in the processing flow application 300 to another MFP.

Figure 7:
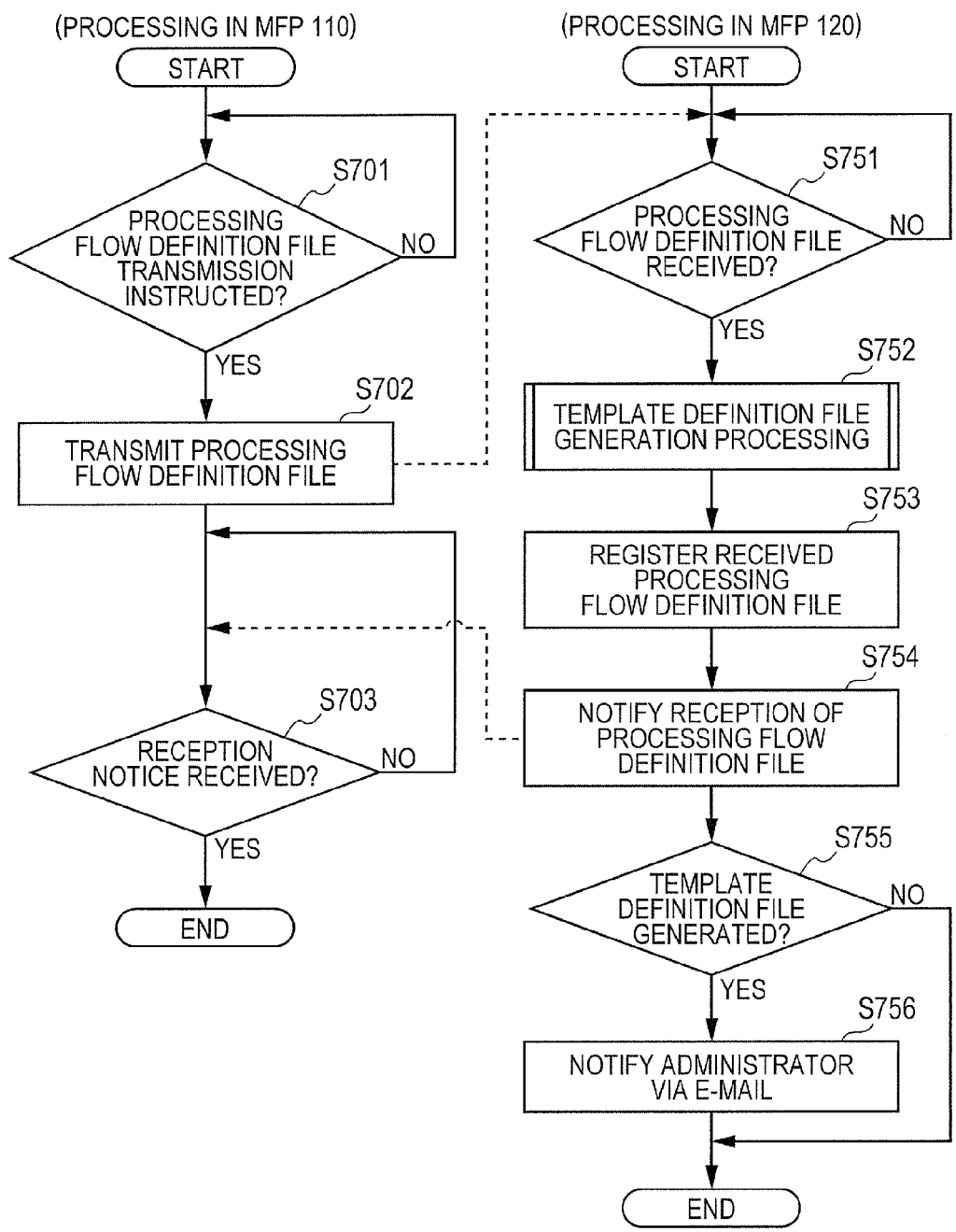
FIG. 7 is a diagram illustrating an example of a flowchart relating to generation processing.

FIG. 7 is a diagram illustrating an example of a flowchart relating to processing (generation processing) to generate a template by transmitting a processing flow definition file from the MFP 110 to the MFP 120.

For example, when the button 604 of the operation screen 600 is pressed by a user, the UI unit 301 displays a UI for inputting set data of an address to which the processing flow definition file is transmitted and a UI for designating the processing flow definition file to be transmitted (not illustrated). After the input and the designation, the UI unit 301 receives an instruction of processing flow definition file transmission.

Note that in this example, a case in which an identifier of the MFP 120 is input as a transmission destination and all processing flow definition files are designated is explained. Here, as an identifier of the MFP 120, any identifier that can transmit processing flow definition files to the MFP 120 such as an IP address and an address of a Web service that the MFP 120 receives processing flow definition files can be used appropriately.

Processes from S701 to S703 are processes performed in the MFP 110.

In S701, the UI unit 301 monitors whether or not a button to transmit a processing flow definition file is pressed by a user. When the UI unit 301 determines that the button is pressed, the UI unit 301 accepts an instruction to transmit a processing flow definition file, instructs the processing flow control unit 302 to transmit the processing flow definition file, and shifts the processing to S702. On the other hand, when the UI unit 301 determines that the button is not pressed, the UI unit 301 continues the monitoring.

In S702, the communication unit 305 transmits all of the designated processing flow definition files to the communication unit 355 in the MFP 120. More specifically, the processing flow control unit 302, firstly, receives from the UI unit 301 an identifier of the MFP 120 that is the transmission destination designated via the UI and a processing flow ID to be transmitted. The processing flow control unit 302 then reads out processing flow definition files identified by the processing flow ID via the processing flow management unit 303, and transfers the transmission destination and the processing flow definition files to the communication unit 305. The communication unit 305 transmits the processing flow definition files transferred from the processing flow control unit 302 to the transmission destination.

In S703, the communication unit 305 monitors whether or not a reception notice is received from the communication unit 355 of the MFP 120. When the communication unit 305 determines that a reception notice is received, the communication unit 305 terminates the processing. On the other hand, when the communication unit 305 determines that the reception notice is not received, the communication unit 305 continues the monitoring.

It should be noted that in this example, the communication unit 305 determines whether or not a reception notice is received. However, the UI unit 301 may display a transmission completion screen on the operation unit 111 after the communication unit 305 receives a reception notice. Additionally, the communication unit 305 may receive transmission errors or the like.

Processes from S751 to S756 are processes performed in the MFP 120.

In S751, the communication unit 355 monitors whether or not all of the processing flow definition files are received. When the communication unit 355 determines that the reception of the processing flow definition files is completed, the communication unit 355 requests that the processing flow control unit 352 register the processing flow definition files. The processing flow control unit 352 handles all of the received processing flow definition files as subject processing flow definition files for generating templates, instructs the template control unit 356 to generate templates, and shifts the processing to S752. On the other hand, when the communication unit 355 determines that the reception of the processing flow definition files are not completed, the communication unit 355 continues the monitoring.

In S752, the template control unit 356 generates templates based on the subject processing flow definition files for generating templates, and shifts the processing to S753. The processing to generate templates in S752 (template definition file generating processing) is described later by using a flowchart in FIG. 8.

In S753, the processing flow control unit 352 requests that the processing flow management unit 353 register the received processing flow definition files. The processing flow management unit 353 registers all of the received processing flow definition files to the processing flow management list 430. Although the processing flow management list 430 after the registration is not illustrated, in this example, all information of the processing flow definition files managed in the processing flow management list 400 is added to (or is in a stated of being managed by) the processing flow management list 430. At that time, the column 431 of the added record is empty. The processing flow control unit 352 notifies the communication unit 355 of completion of registration, and shifts the processing to S754.

In S754, the communication unit 355 notifies the communication unit 305 in the MFP 110 of completion of reception of the processing flow definition files, and shifts the processing to S755. In S755, the template control unit 356 determines whether or not templates are generated in S752. When templates are generated, the template control unit 356 shifts the processing to S756. Meanwhile, when the templates are not generated, the template control unit 356 terminates the processing.

In S756, the communication unit 355 notifies an administrator at his/her e-mail address (an example of predesignated notification destination) of generation of templates and terminates the processing. In this manner, by notifying an administrator, the administrator can find out that templates are generated.

Figure 8:
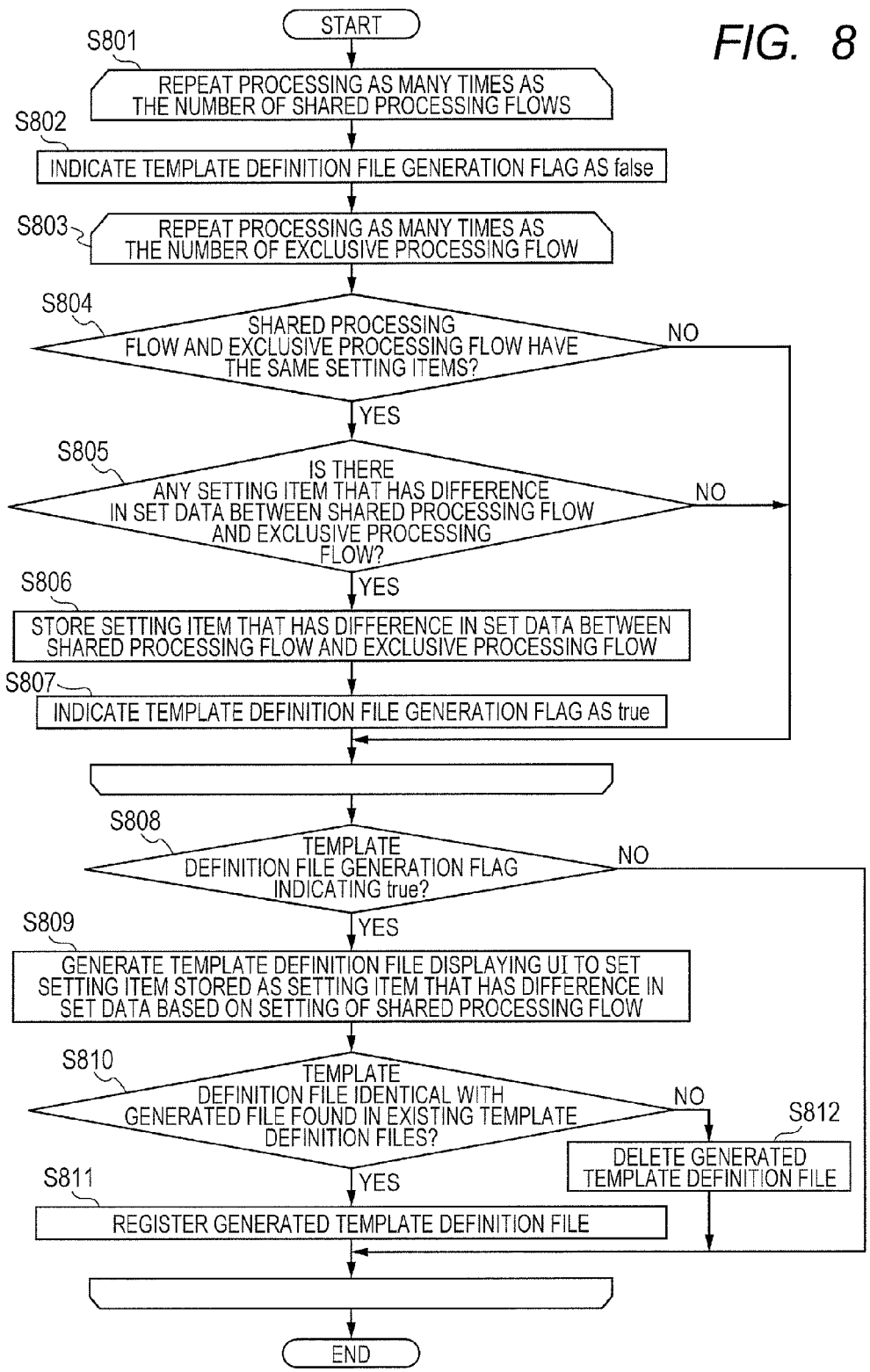
FIG. 8 is a diagram illustrating an example of a flowchart relating to generating processing.

FIG. 8 is a diagram illustrating an example of a flowchart relating to processing (generating processing) to generate templates from processing flow definition files. FIG. 8 illustrates an example of processing in S752.

In S801, the template control unit 356 repeats processing from S802 to S881 or S812 as many time as the number of shared processing flows of the processing flows of the subject processing flow definition files for generating templates. The template control unit 356 determines whether the subject processing flow definition files are of shared processing flows or of exclusive processing flows from, for example, the attribute 503 of the processing flow definition file 500 described in FIGS. 5A and 5B.

In S802, the template control unit 356 temporarily holds a flag (generation flag) indicating generation of templates from the processing flow definition files of shared processing flows that are the processing subject. At that time, the generation flag is initialized as it indicates "false" representing that templates are not generated. The template control unit 356 then shifts the processing to S803.

In S803, the template control unit 356 repeats the processing from S804 to S807 as many times as the number of exclusive processing flow of the processing flows of the subject processing flow definition files for generating templates.

In S804, the template control unit 356 compares the setting items of the processing flow definition files of the shared processing flows and the setting items of the processing flow definition files of the exclusive processing flows to determine whether or not the setting items are the same. In the example of the processing flow definition file 500, whether or not the setting items are the same is determined by whether or not all tags from the tag 505 to the tag 513, which indicate setting items, are the same. When the template control unit 356 determines that the setting items are the same, the template control unit 356 shifts the processing to S805. Meanwhile, when the template control unit 356 determines that the setting items are not the same, the template control unit 356 shifts the processing to the end of the repeat in S803.

In S805, the template control unit 356 searches for a setting item for which set data is different in the processing flow definition files of the shared processing flows and the processing flow definition files of the exclusive processing flows. In the example of the tag 511 of the processing flow definition file 500, if the set data provided in the "EmailAddress" tag of the exclusive processing flows to be compared with is different from "aaa@co.jp," the template control unit 356 determines that the set data is different. In the case of the processing flow definition file 500, the template control unit 356 compares the set data in all of the tags from the tag 505 to the tag 513.

When the template control unit 356 determines that there is a setting item for which set data is different, the template control unit 356 shifts the processing to S806. Meanwhile, the template control unit 356 determines that all the set data is the same, the template control unit 356 shifts the processing to the end of the repeat in S803.

In S806, the template control unit 356 temporarily stores information indicating the setting items for which set data is different, which were found in S805, and shifts the processing to S807. In S807, the template control unit 356 stores the generation flag as "true" that indicates that templates are generated. Afterwards, when the template control unit 356 determines that the repeat of the shared processing flows to be processed as many times as the number of the exclusive processing flows has not been completed, the template control unit 356 shifts the processing to S804. Meanwhile, when the template control unit 356 determines that the repeat of the shared processing flows to be processed as many times as the number of the exclusive processing flows has been completed, the template control unit 356 shifts the processing to S808.

In S808, the template control unit 356 checks the generation flag. When the generation flag indicates as "true," the template control unit 356 shifts the processing to S809, but when the generation flag indicates as "false," the template control unit 356 shifts the processing to the end of the repeat in S801. At the end of the repeat, when the template control unit 356 determines that the processing for all of the shared processing flows has not been completed (the repeat as many times as the number of the shared processing flows has not been completed), the template control unit 356 shifts the processing to S802. When the template control unit 356 determines that the processing has been completed, the template control unit 356 terminates the processing.

In S809, the template control unit 356 generates templates and shifts the processing to S810.

Templates are generated by the template control unit 356 in the following manner. As a definition of a task in a "JobScript" tag (setting item) of a template, the template control unit 356 sets the definition of the task in the "JobScript" tag (setting item) of the processing flow definition file of the shared processing flow. In addition, as data in the "TemplateName" tag of a template, the template control unit 356 sets data in the "name" attribute of the processing flow definition file of the shared processing flow.

The template control unit 356 also sets information indicating the setting item stored in S806 as data in the "UserSettingItem" tag. An example of a case in which the processing flow definition file of a shared processing flow is the processing flow definition file 500 is described below. When the information indicating the setting item stored in S806 is "EmailAddress" and "FileName," the data in the "UserSettingItem" tag becomes "EmailAddress, FileName."

As described above, the template control unit 356 generates templates based on the processing flow definition file of shared processing flows and information indicating a setting item for which set data is different in the shared processing flow and the exclusive processing flow.

In S810, the template control unit 356 determines whether or not a template that is identical with the template generated in S809 exits with reference to the template management list 460 managed by the template management unit 357.

When the template control unit 356 determines that the identical template does not exist, the template control unit 356 shifts the processing to S811. Meanwhile, when the template control unit 356 determines that the identical template exits, the template control unit 356 shifts the processing to S812. In the present embodiment, the template control unit 356 determines that templates are identical when the data in the "UserSettingItem" tag and the data in the "JobScript" tag in the templates are identical.

In S811, the template control unit 356 requests that the template management unit 357 register the generated template. At that time, the template control unit 356 requests that the data in the column 463 be registered as "hide." The reason of the request to register as "hide" is described later. The template management unit 357 registers the record of the template transferred from the template control unit 356 to the template management list 460, and terminates the processing.

In S812, the template control unit 356 deletes the template generated in S809 and terminates the processing. As a result, identical templates would not be registered.

(Confirmation of Template)

Next, processing when an administrator logged in the MFP 120 after the processing flow definition file is received and a template is generated is described by using FIG. 9 and FIGS. 10A to 10C. Firstly, the MFP 120 displays a login authentication screen on the operation unit 111 (not illustrated). On accepting login processing of the user operation on the login authentication screen, the MFP 120 starts the processing in S901 in FIG. 9.

Figure 9:
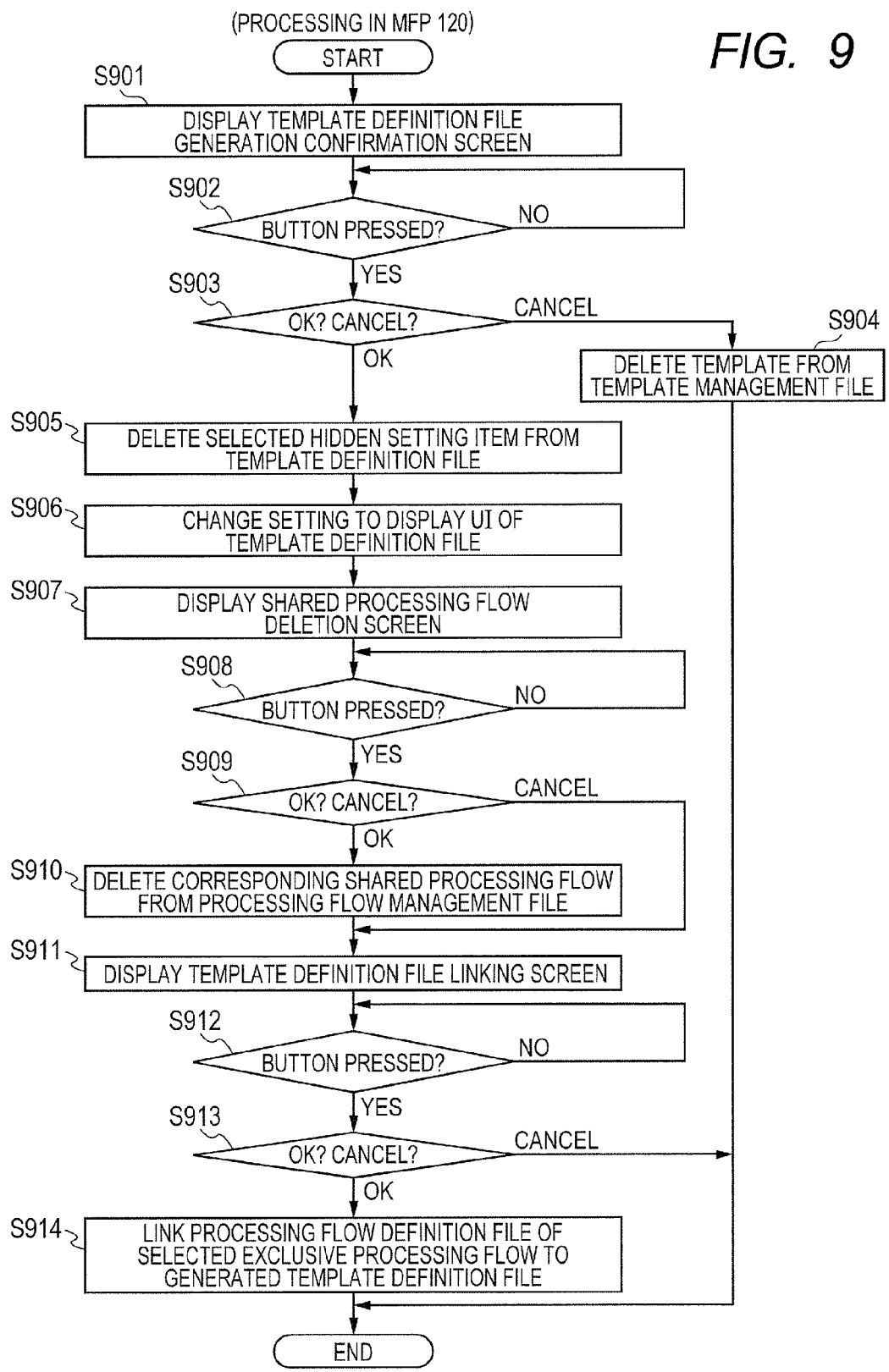
FIG. 9 is a diagram illustrating an example of a flowchart relating to confirmation processing.

FIG. 9 is a diagram illustrating an example of a flowchart relating to processing (template confirmation processing) at the time when an administrator logged in the MFP 120 after a template is generated. In S901, the UI unit 351 displays a UI for confirming that a template is generated (e.g., a confirmation screen 1000 in FIG. 10A).

Figure 10A:
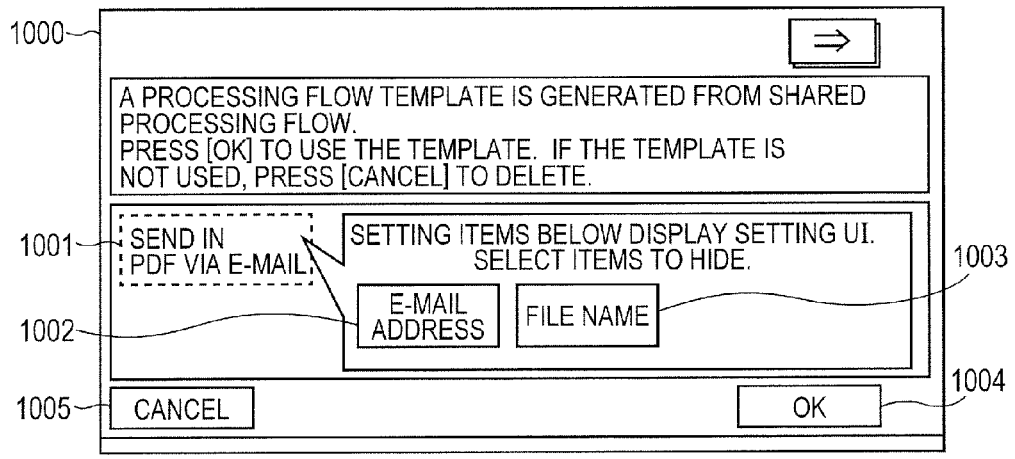
FIGS. 10A, 10B and 10C are diagrams illustrating an example of a UI.

FIG. 10A is a diagram illustrating an example of a UI (confirmation screen 1000) for confirming the generation of a template displayed in S901.

A label 1001 indicates a template generated in S809. A button 1002 indicates "e-mail address" that is a setting item displaying the setting screen at the time when a user generates a processing flow definition file from a template. When the button 1002 is pressed, the button 1002 is in a selected state. A button 1003 indicates "document name" that is a setting item displaying the setting screen when the user generates the processing flow definition file from the template. When the button 1003 is pressed, the button 1003 is in a selected state.

The buttons representing setting items displaying the setting screen at the time when a user generates a processing flow definition file from a template is displayed corresponding to the information indicating the setting items provided in the data in the "UserSettingItem" tag in the template. In this example, "EmailAddress, FileName" is provided as the data in the "UserSettingItem" tag. Consequently, the button 1002 is displayed corresponding to "EmailAddress" and the button 1003 is displayed corresponding to "FileName."

A button 1004 is a button to designate to use the template (OK button). A button 1005 is a button to designate not to use the template (cancel button).

The reference returns to FIG. 9 and the processing is further described below. In S902, the UI unit 351 detects whether or not the OK button or the cancel button is pressed in the UI for confirmation. More specifically, when the UI unit 351 determines that either the OK button or the cancel button is pressed, the UI unit 351 shifts the processing to S903. Meanwhile, the UI unit 351 determines that neither the OK button nor the cancel button is pressed, the UI unit 351 continues monitoring.

In S903, the UI unit 351 determines whether the pressed button is either the OK button or the cancel button. When the UI unit 351 determines that the OK button is pressed, the UI unit 351 shifts the processing to the S905. Meanwhile the UI unit 351 determines that the cancel button is pressed, the UI unit 351 shifts the processing to S904.

In S904, the template control unit 356 deletes a template by requesting the deletion of the template to the template management unit 357. More specifically, the template control unit 356 receives a template ID to be deleted from the UI unit 351. The template control unit 356 transfers the template ID to the template management unit 357, and the template management unit 357 deletes the record of the template identified by the template ID from the template management list and also deletes the corresponding template. As a result, if the automatically generated template is not a template desired by the administrator, such a template can be deleted.

In S905, the template control unit 356 deletes information indicating a setting item corresponding to the setting item button selected on the confirmation screen 1000 and shifts the processing to S906.

For example, when the button 1004 is pressed while the button 1003 is in the selected state, the UI unit 351 notifies the template control unit 356 of "document name." The template control unit 356 deletes "FileName" that represents the document name from the data in the "UserSettingItem" tag in the template. It should be noted that information that associates "document name" with "FileName" is provided in advance in the HDD 204 and programs.

As a result, the administrator can change the setting of whether or not a UI to input set data in the setting item is displayed after a template is automatically generated.

In S906, the template control unit 356 changes the data in the column 463 of the template management list 460 to "display" via the template management unit 357, and shifts the processing to S907. By setting the data to "hide" at the time of generating a template, even after the template is automatically generated, a button that allows a user to generate a processing flow definition file from the template is not immediately displayed on the operation unit 111. At a point in time at which the administrator decides to use the template, the button is displayed on the operation unit 111 and becomes available by changing the data of the column 463 of the template management list 460 to "display" in S906.

Figure 10B:
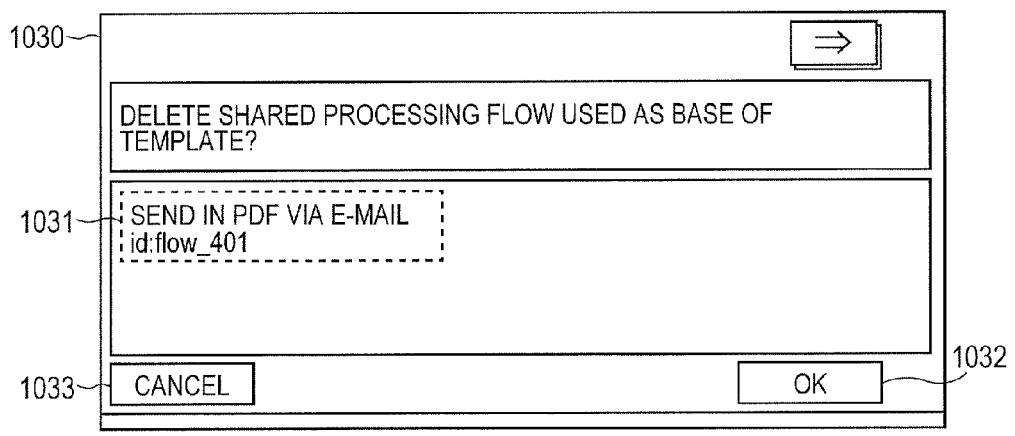

In S907, the UI unit 351 displays a UI to delete the processing flow definition file of the shared processing flow used in the generation of a template (e.g., a deletion screen 1030 in FIG. 10B).

FIG. 10B is a diagram illustrating an example of a UI (the deletion screen 1030) to delete the processing flow definition file of the shared processing flow used in the generation of the template displayed in S907.

A label 1031 indicates the shared processing flow of the processing flow definition file used (as a base) at the time of generating a template indicated by the label 1001. A button 1032 is a button to delete the processing flow definition file of the shared processing flow (OK button). A button 1033 is a button to cancel the deletion of the processing flow definition file of the shared processing flow (cancel button).

The reference returns to FIG. 9 once again and the processing is further described below. In S908, the UI unit 351 detects whether or not the OK button or the cancel button is pressed in the UI for deletion. More specifically, when the UI unit 351 determines that either the OK button or the cancel button is pressed, the UI unit 351 shifts the processing to S909. Meanwhile, the UI unit 351 determines that neither the OK button nor the cancel button is pressed, the UI unit 351 continues monitoring.

In S909, the UI unit 351 determines whether the pressed button is either the OK button or the cancel button. When the UI unit 351 determines that the OK button is pressed, the UI unit 351 shifts the processing to the S910. Meanwhile the UI unit 351 determines that the cancel button is pressed, the UI unit 351 shifts the processing to S911.

In S910, the processing flow control unit 352 deletes the record of the shared processing flow from the processing flow management list 430 via the processing flow management unit 353 as well as deleting the processing flow definition file of the shared processing flow, and shifts the processing to S911. In this example, the processing flow control unit 352 deletes the record of the shared processing flow of the flow ID being "flow_401" from the processing flow management list 430 and also deletes the processing flow definition file of the flow ID being "flow_401."

In S911, the UI unit 351 displays a UI (e.g., a linking screen 1060 in FIG. 10C) to link a processing flow definition file of an exclusive processing flow to a template.

Figure 10C:
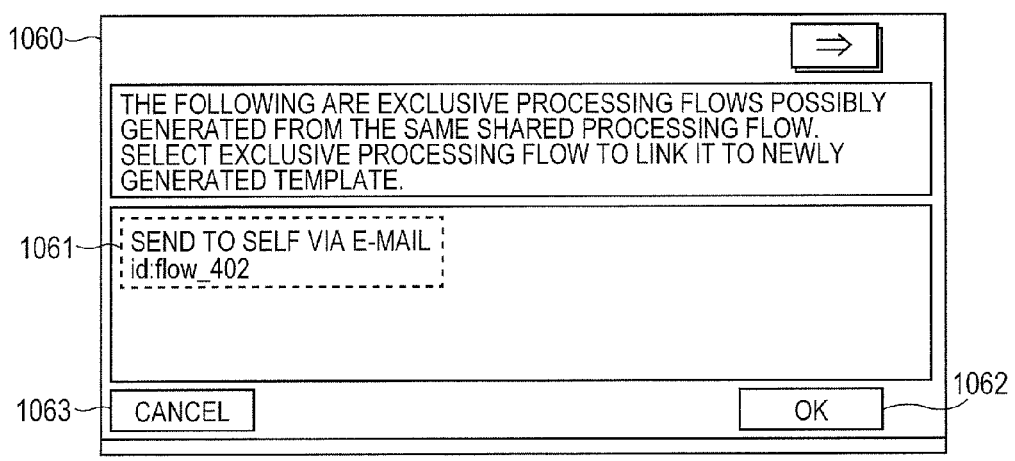

FIG. 10C is a diagram illustrating an example of the UI (linking screen 1060) to link the template displayed in S911 with a processing flow definition file of an exclusive processing flow.

A label 1061 indicates an exclusive processing flow of the processing flow definition file of which the set data was compared in S805. In other words, the label 1061 indicates an exclusive processing flow of a processing flow definition file that is likely to be generated from the processing flow definition file of the shared processing flow. In this example, the label 1061 indicates an exclusive processing flow of the processing flow definition file of the flow ID being "flow_402."

A button 1062 is a button to link the generated template with the processing flow definition file of the exclusive processing flow indicated by the label 1061 (OK button). A button 1063 is a button to cancel the linking of the generated template with the processing flow definition file of the exclusive processing flow indicated by the label 1061 (cancel button).

The reference returns to FIG. 9 once again and the processing is further described below. In S912, the UI unit 351 detects whether or not the OK button or the cancel button is pressed in the UI for linking. More specifically, when the UI unit 351 determines that either the OK button or the cancel button is pressed, the UI unit 351 shifts the processing to S913. Meanwhile, the UI unit 351 determines that neither the OK button nor the cancel button is pressed, the UI unit 351 continues monitoring.

In S913, the UI unit 351 determines whether the pressed button is either the OK button or the cancel button. When the UI unit 351 determines that the OK button is pressed, the UI unit 351 shifts the processing to the S914. Meanwhile the UI unit 351 determines that the cancel button is pressed, the UI unit 351 terminates the processing.

In S914, the processing flow control unit 352 stores the template ID of the generated template in the column 431 of the processing flow management list 430 via the processing flow management unit 353, and terminates the processing. In this example, the processing flow control unit 352 stores the template ID in the column 431 of the record in which the flow ID of the processing flow management list 430 is "flow_402." As a result of this linking, at the time of editing a processing flow definition file of an exclusive processing flow, the processing flow definition file can be edited in the same manner as editing the linked template by displaying only the setting screen for e-mail address, for example.

As described above, when a processing flow definition file is received, a processing flow definition file of a shared processing flow, which was used as a template, is searched and a template is automatically generated based on the searched processing flow definition file.

As a result, a user can generate a processing flow definition file from the template generated based on the processing flow definition file of the shared processing flow. In other words, burden on the user at the time of generating a processing flow definition file is reduced because the less operation procedures are needed when a processing flow definition file is generated from a template than when a processing flow definition file is generated from the processing flow definition file of the shared processing flow.

Embodiment 2

Next, Embodiment 2 is described. In Embodiment 1, a method for automatically generating a template by transmitting a processing flow definition file from the MFP 110 to the MFP 120 is described. In the present embodiment, a method for automatically generating a template at arbitrary timing of an administrator is described.

It should be noted that the configuration of the present embodiment is basically identical with the configuration of Embodiment 1. Therefore a configuration that is different from Embodiment 1 is mainly described in the present embodiment.

(Generation of Template)

Figure 11:
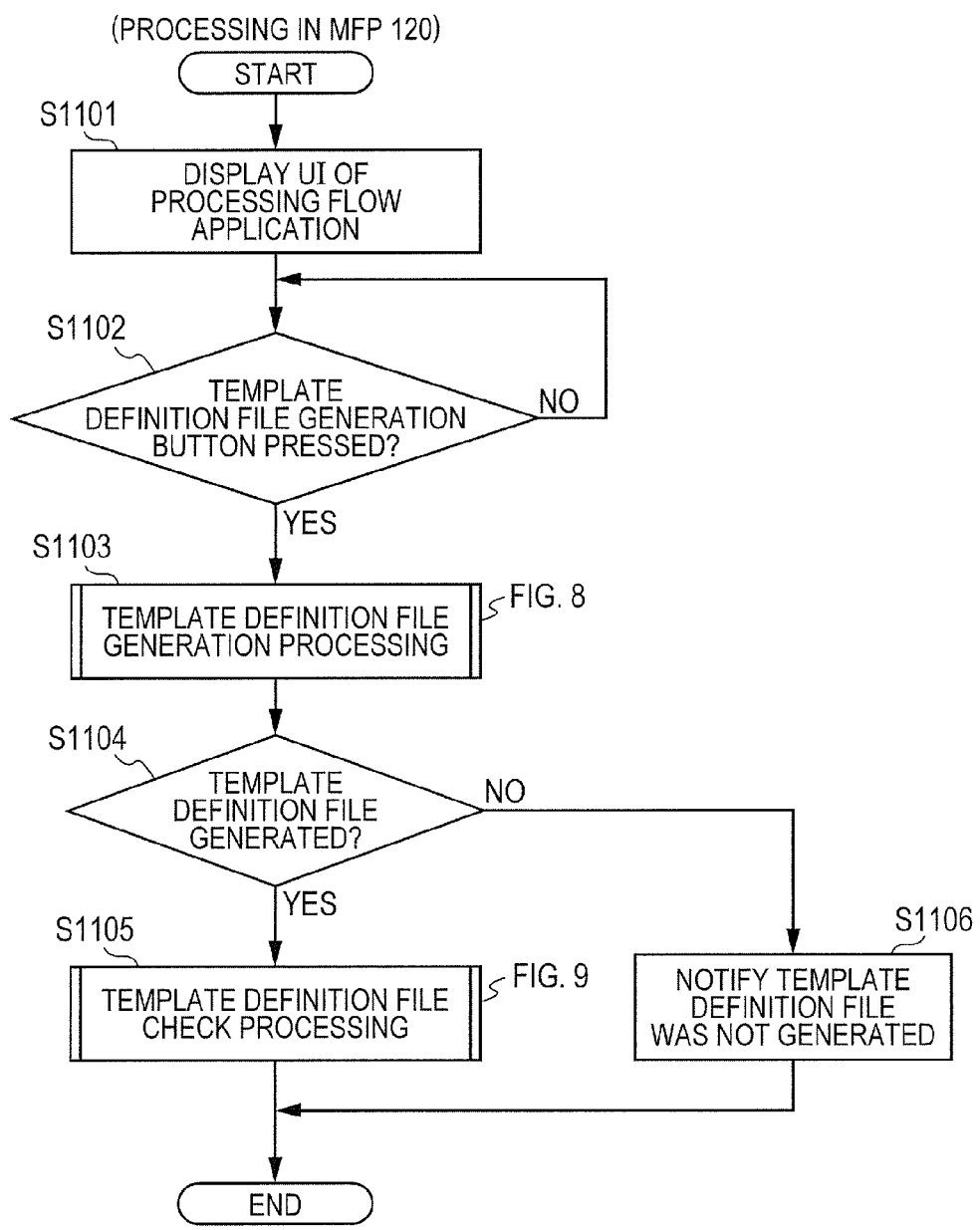
FIG. 11 is a diagram illustrating an example of a flowchart relating to generation processing.
Figure 12:
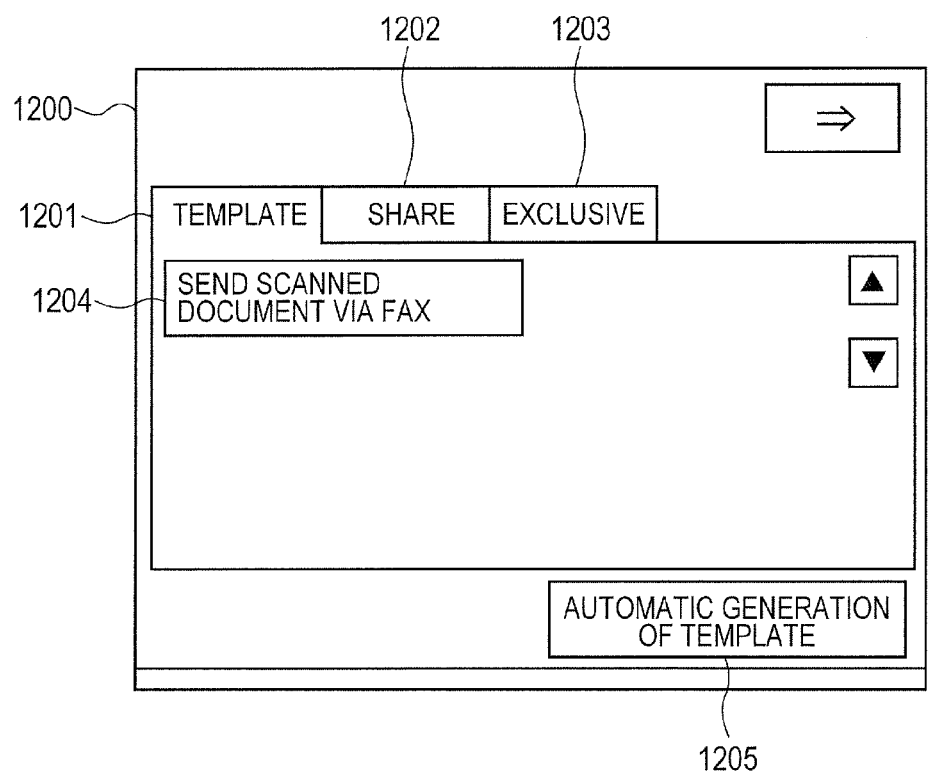
FIG. 12 is a diagram illustrating an example of a UI.

Processing at the time of automatically generating a template in the present embodiment is described by using FIG. 11 and FIG. 12. Firstly, the MFP 120 displays a login authentication screen on the operation unit 111 (not illustrated). When the MFP 120 accepts the login processing via a user operation on the login authentication screen, the MFP 120 starts the processing in S1101 in FIG. 11.

FIG. 11 is a diagram illustrating an example of a flowchart relating to the processing (generation processing) to generate (to automatically generate) a template based on an instruction to generate a template from an administrator. In S1101, the UI unit 351 displays a UI for automatic generation (e.g., a top screen 1200 of FIG. 12), which is provided by the processing flow application 350.

FIG. 12 is a diagram illustrating an example of a UI (the top screen 1200) to perform automatic generation displayed in S1101. A tab page 1201 is a tab page for displaying a button that allows a user to generate a processing flow definition file from a template. A button corresponding to the record in the template management list 460 is displayed. In FIG. 12, the tab page 1201 is active, and a button 1204 is displayed.

A tab page 1202 is a tab page for displaying a button to execute a shared processing flow. A tab page 1203 is a tab page for displaying a button to execute an exclusive processing flow. A button 1204 is a button that allows the user to generate a processing flow definition file from a template. In FIG. 12, a button 1204 of the record 465 with the template name being "send scanned document via fax" is displayed. A button 1205 is a button (automatic generation button) that allows the user to execute automatic generation of a template.

The reference returns to FIG. 11 and the processing is further described below. In S1102, the UI unit 351 monitors whether to not the automatic generation button is pressed in the UI to perform automatic generation. When the UI unit 351 determines that the automatic generation button is pressed, the UI unit 351 shifts the processing to S1103. Meanwhile, when the UI unit 351 determines that the automatic generation button is not pressed, the UI unit 351 continues the monitoring.

In S1103, the template control unit 356 generates a template and shifts the processing to S1104. Because this processing is the same as the processing described in FIG. 8, further descriptions are omitted. In S1104, the template control unit 356 determines whether or not a template is generated in S1103. When a template is generated, the template control unit 356 shifts the processing to S1105. When the template is not generated, the template control unit 356 shifts the processing to S1106.

In S1105, the processing flow application 350 performs template confirmation processing and terminates the processing. Because this confirmation processing is the same as the processing described in FIG. 9, further descriptions are omitted.

In S1106, the UI unit 351 displays that a template is not generated on the operation unit 111 and terminates the processing.

According to the above-described configuration, it is possible to automatically generating a template at arbitrary timing of the administrator. Moreover, it is possible to automatically generate a template after processing flow definition files are received from multiple MFPs.

Other Embodiments

Furthermore, the present invention can be realized by executing the following processing. That is processing that provides software (program) that realizes the functions of the above-described embodiments to a system or an apparatus via a network or various recording medium and that causes a computer (or a CPU or an MPU) of the system or the apparatus to read out and execute the program.

According to the configurations of the above-described embodiments, set data in setting items of a series of processes can be received in more proper manner.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-284123, filed Dec. 26, 2011, which is hereby incorporated by reference herein in its entirety.

What is claimed is:

1. An image processing apparatus for executing a series of processes in accordance with setting items and values of the setting items in response to a user operation, the setting items being included in a definition file that defines the series of processes, the image processing apparatus comprising:
a reception unit configured to receive a plurality of definition files including a specific definition file having a user-specific setting and a common definition file having no user-specific setting;
a determination unit configured to determine a setting item that is commonly included in the received specific definition file and in the received common definition file and that has different values between the received specific definition file and common definition file;
a generating unit configured to generate a template file using information on the determined setting item and the common definition file;
a control unit configured to register the generated template file in a storage unit;
a providing unit configured to provide a user with a screen for selecting whether or not a user interface that accepts a value of the determined setting item is to be displayed, when a new definition file is generated using the generated template file; and
a deleting unit configured to delete, when the new definition file is generated using the template file, the common definition file that has been used for generation of the template file in response to an acceptance of a deleting instruction,
wherein at least one of the reception unit, the determination unit, the generating unit, the control unit, the providing unit and the deleting unit is implemented using a CPU.

2. The image processing apparatus according to claim 1, further comprising a notification unit configured to notify the generation of the template file by the generating unit to a pre-designated destination.

3. The image processing apparatus according to claim 1, further comprising a display unit configured to display a user interface that accepts entry of an instruction for making the generated template file available,
wherein the providing unit is configured to provide the user with the user interface that accepts the value of the determined setting item, when the entry of the instruction is accepted.

4. The image processing apparatus according to claim 1, wherein, when an instruction has been accepted that instructs linking of the specific definition file to the generated template file upon editing the specific definition file, the providing unit is configured to provide the user with the user interface that accepts the value of the determined setting item based on the information on the determined setting item included in the generated template file.

5. An image processing method comprising steps of:
receiving a plurality of definition files including a specific definition file having a user-specific setting and a common definition file having no user-specific setting;
determining a setting item that is commonly included in the received specific definition file and in the received common definition file and that has different values between the received specific definition file and common definition file;
generating a template file using information on the determined setting item and the common definition file;
registering the generated template file in a storage unit;
providing a user with a screen for selecting whether or not a user interface that accepts a value of the determined setting item is to be displayed, when a new definition file is generated using the generated template file; and
deleting, when the new definition file is generated using the template file, the common definition file that has been used for generation of the template file in response to an acceptance of a deleting instruction.

6. A non-transitory computer-readable storage medium storing a computer program that when executed causes a computer to perform an image processing method of an image processing apparatus, the image processing method comprising steps of:
receiving a plurality of definition files including a specific definition file having a user-specific setting and a common definition file having no user-specific setting;
determining a setting item that is commonly included in the received specific definition file and in the received common definition file and that has different values between the received specific definition file and common definition file;
generating a template file using information on the determined setting item and the common definition file;
registering the generated template file in a storage unit;
providing a user with a screen for selecting whether or not a user interface that accepts a value of the determined setting item is to be displayed, when a new definition file is generated using the generated template file; and
deleting, when the new definition file is generated using the template file, the common definition file that has been used for generation of the template file in response to an acceptance of a deleting instruction.

* * * * *